July 21, 1942.                    C. WYSS                    2,290,403
                            IRRIGATION PIPE JOINT
                            Filed July 6, 1940

Inventor
Chris Wyss
Attorney
Clive Hartson

Patented July 21, 1942

2,290,403

UNITED STATES PATENT OFFICE 2,290,403

IRRIGATION PIPE JOINT

Chris Wyss, Tillamook, Oreg.

Application July 6, 1940, Serial No. 344,209

2 Claims. (Cl. 285—175)

This invention relates to irrigation pipe joints and is particularly related to those joints which are self-sealing requiring no threads of any kind.

The primary object of my invention is to provide a locking means for holding pipe joints together without any moving parts for locking the same.

Another object of my invention is to provide a skirt or guide on one of the pipes for guiding the other of the pipe into the joint.

A further object of my invention is to provide a fastening means for irrigation pipe joints that can be locked in position or unlocked by manipulating the pipe, which is inserted in the joint from a distant point from the joint.

In my new and improved locking construction I employ a bayonet joint principle for holding the pipes together at the joint.

A further object of my invention is to provide a skirt next to the joint that will keep dirt and trash out of the joint.

And a still further object of my new and improved joint is to provide a locking mechanism that will permit the pipes to be joined to assume an angle to one another for making turns or to follow the contour of uneven surfaces.

These and other incidental objects will be apparent in the drawing, specification and claims.

Referring to the drawing.

In the drawing.

Figure 1:
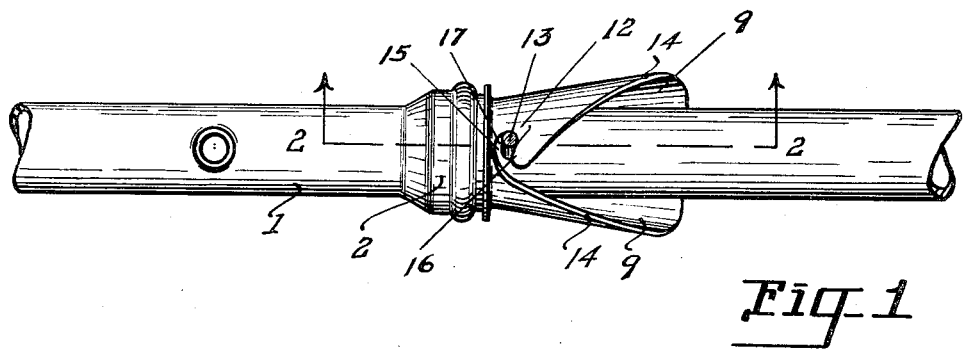
Figure 1 is a plan view of an assembled joint between two pipes connecting the pipes together.
Figure 2:
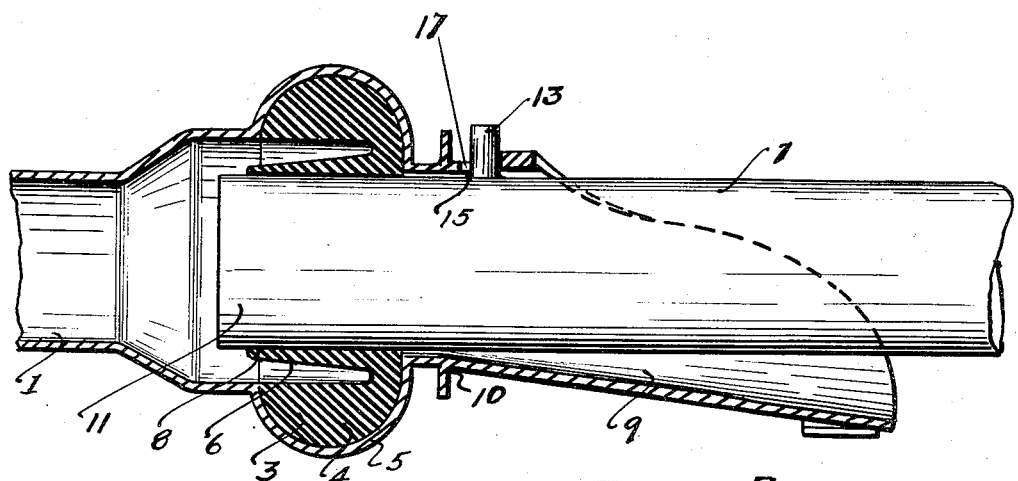
Figure 2 is a fragmentary sectional view, taken on line 2—2 of Figure 1, looking in the direction indicated.
Figure 3:
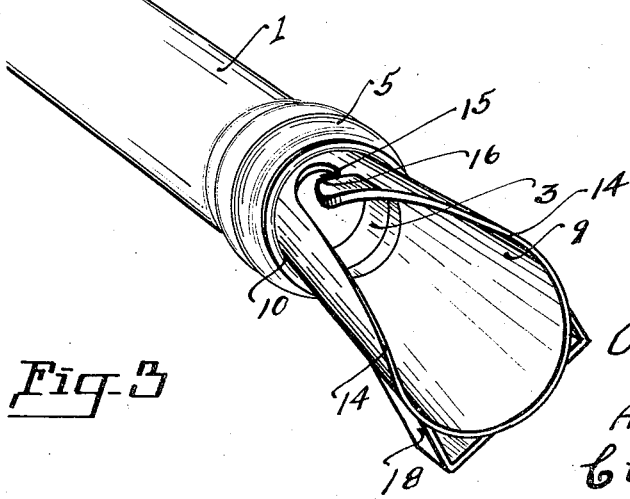
Figure 3 is a perspective end view of the female end of the joint.

1 is an irrigation pipe having the joint 2 secured thereto in the usual manner. A sealing gasket 3 is held in place within the female end of the joint 2. The main body 4 of the gasket 3 is held in position within the annular expanded portion 5 of the joint. The sealing portion of the gasket 6 surrounds the pipe 7 at 8, thus far this is conventional construction.

My invention consists of applying a skirt 9 to the female coupling 2 at 10, this skirt 9 provides a guide for inserting the male coupling end 11 of the pipe 7. When the male end of the coupling 11 is inserted into the skirt 9 and forced towards the female end of the coupling, the skirt guides the same in this operation. A bayonet joint 12 is provided for holding the coupling together. The pin 13 of the bayonet joint is fixed to the male end 11 of the coupling, and as the pipe 7 is inserted into the skirt this pin is guided on the cam surface 14 of the skirt 9, directing said pin into the slot 15 of the bayonet joint 12. The retentive wall of the slot 15 is provided with a hump 16 to prevent the pin 13 from leaving the slot when the coupling has been made.

In uncoupling or coupling the joint the operator raises the outer end of the pipe 7, this causes the pin 13 to leave the hump surface 16 of the bayonet slot 15, entering the space 17. This permits the easy reverse rotation of the pipe 7 releasing the pin 13 from the bayonet slot 12 permitting the male end 11 of the coupling to be removed from the female joint 2.

In order to hold the pipe line in a predetermined position a foot or base 18 is provided and secured to the underside of the skirt 9 for holding the same in the desired position and preventing the same from rotating.

In the operation of coupling the pipes 1 and 7 together the operator may couple or uncouple the joint without being near the joint by simply manipulating the pipe 7 at a suitable distance from the joint. In this principle considerable time and effort is saved in coupling or uncoupling the joints.

I do not wish to be limited to the exact mechanical construction, as other forms of mechanical embodiment may be employed still coming within the scope of the claims to follow.

What I claim is:

1. An irrigation pipe coupling comprising a female coupling interiorly adapted for receiving a male coupling, a skirt projecting longitudinally from the mouth of the female coupling, said skirt being tapered and its smallest diameter being at its junction with the female coupling, said skirt having an opening in the top thereof which opening extends longitudinally thereof from its inner end, at the juncture with the female coupling, to its outer end; said opening at the inner end of the skirt terminating in a bayonet slot, the width of said opening constantly increasing from its inner end to its outer end and its intermediate width being sufficient to permit the dropping of the end of the male coupling therethrough into the interior of the skirt, the taper of said skirt serving as a guide for the insertion of a male coupling into the female coupling when the male coupling is moved longitudinally therein toward the female coupling, and the bayonet slot receiving a pin projecting from the male coupling when the male coupling is moved as aforesaid.

2. An irrigation pipe coupling comprising a female coupling interiorly adapted for receiving a male coupling, a skirt projecting longitudinally from the mouth of the female coupling, said skirt having an opening in the top thereof which opening extends longitudinally thereof from its inner end, at the juncture with the female coupling, to its outer end; said opening at the inner end of the skirt terminating in a bayonet slot, the width of said opening constantly increasing from its inner end to its outer end and its intermediate width being sufficient to permit the dropping of the end of a male coupling therethrough into the interior of the skirt, said skirt serving as a guide for the insertion of a male coupling into the female coupling when the male coupling is moved longitudinally thereof toward the female coupling, and the bayonet slot receiving a pin projecting from the male coupling when the male coupling is moved as aforesaid.

CHRIS WYSS.